United States Patent Office 3,050,106
Patented Aug. 21, 1962

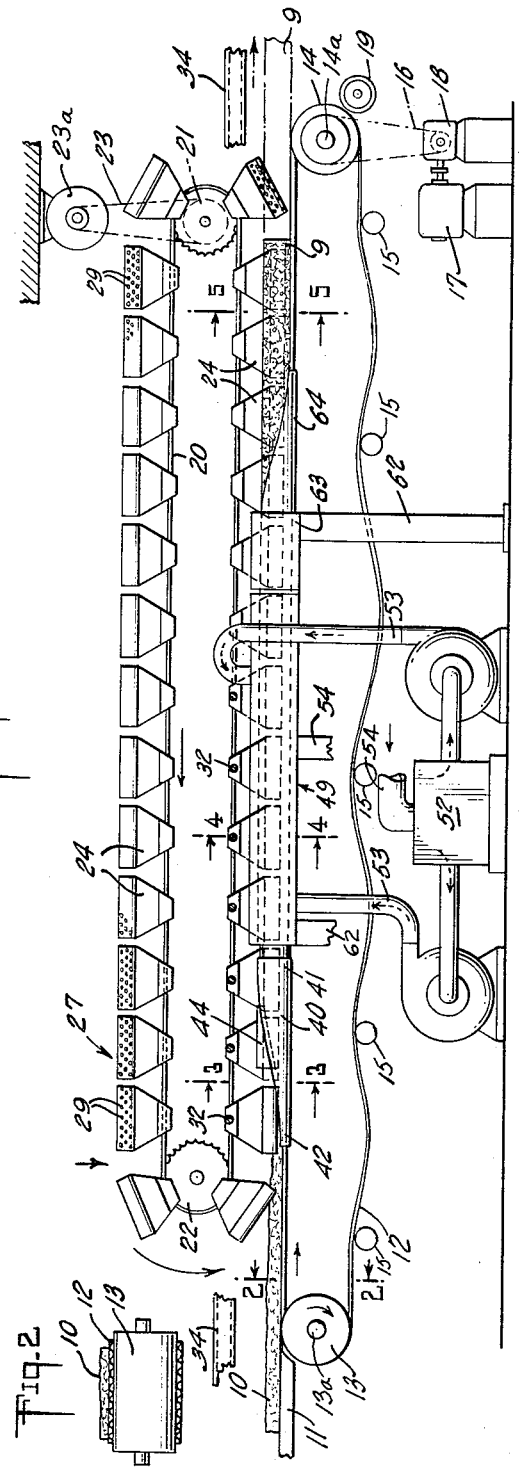

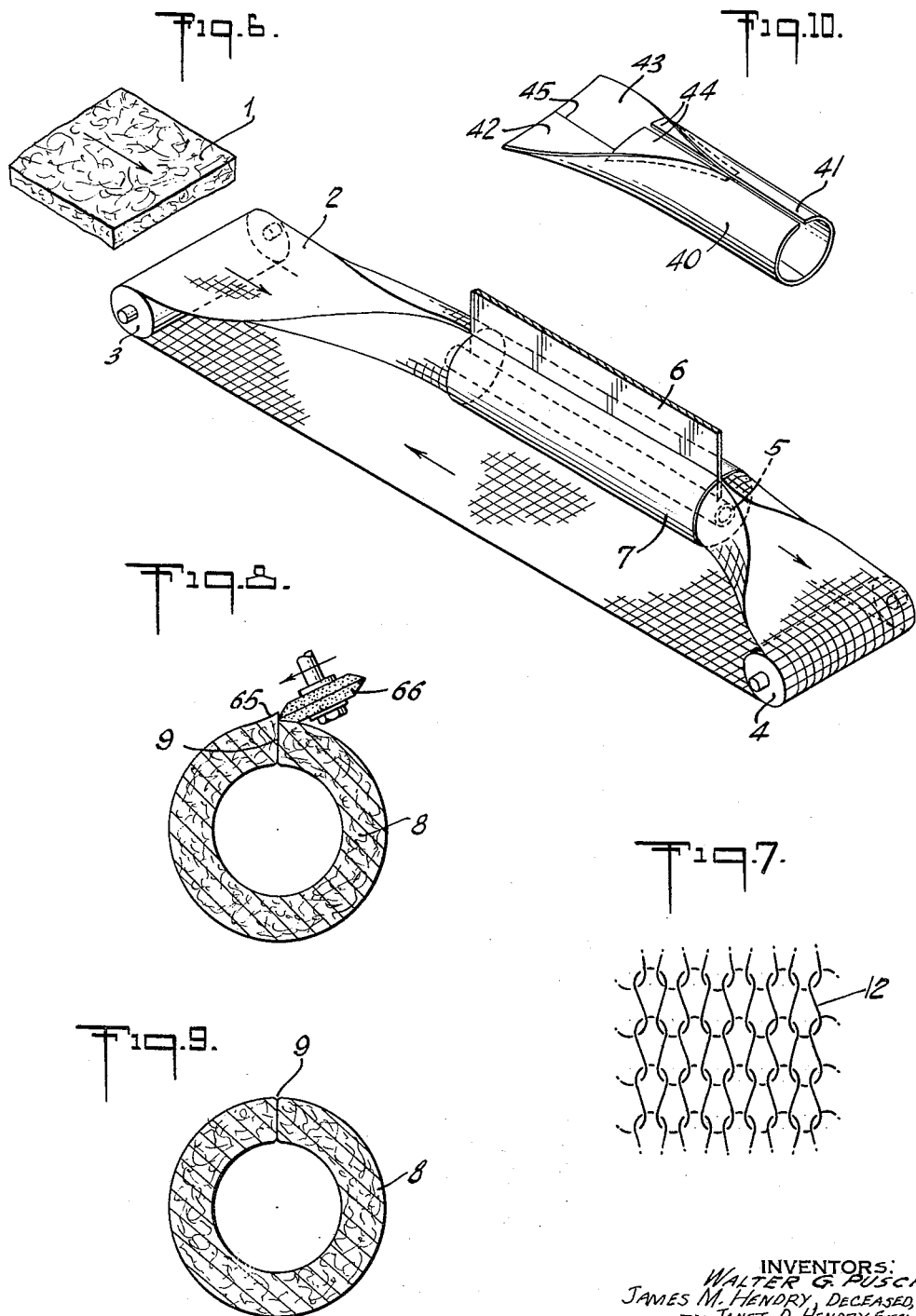

3,050,106
METHOD AND APPARATUS FOR FORMING PIPE INSULATION
Walter G. Pusch, New Brunswick, N.J., James M. Hendry, deceased, late of Centerville, N.J., by Janet D. Hendry, executrix, Centerville, N.J., and Foster V. Hulsizer, Clinton, N.J., assignors to Johns-Manville Corporation, New York, N.Y., a corporation of New York
Filed Mar. 3, 1958, Ser. No. 721,328
(Filed under Rule 47(a) and 35 U.S.C. 116)
13 Claims. (Cl. 156—457)

This invention relates to apparatus for forming pipe insulation. A felt of any type of fibrous insulating material, such as asbestos, rock wool, glass or synthetic fiber, is fed onto an endless conveyor belt where it is sucessively contacted by a plurality of mandrels carried by an endless chain mounted above and moving in the same direction as the conveyor belt. The insulating material and the belt are wrapped around the mandrels by a shoehorn former and the composite is fed into an oven for curing. After curing, the belt and mandrels are removed leaving the finished pipe insulation. In this invention the term felt includes a mat or web and means either a felted or woven sheet of insulating material.

It is an object of the invention to provide apparatus for producing fully round pipe insulation wherein a shoehorn former wraps insulating material and a belt around a mandrel and the composite is fed through a curing oven.

It is a further object of this invention to provide apparatus for producing pipe insulation by feeding a continuous felt of insulating material onto an endless belt which is then wrapped around a perforated mandrel to the desired form.

It is still a further object of this invention to provide apparatus for producing pipe insulation by feeding a continuous felt of insulating material onto an endless conveyor belt where the felt comes into contact with mandrels secured to a chain moving the mandrels parallel to the conveyor belt so that said felt locks said belt to said mandrels for movement therewith, and wrapping the insulating material and said belt around said mandrels.

The invention will be more fully understood and further objects and advantages thereof will become apparent when reference is made to the following detailed description of a preferred embodiment of the invention and the accompanying drawings in which:

FIG. 1 is a front elevation of the apparatus used in making pipe insulation;

FIG. 2 is a section taken on the plane passing through the line 2—2 of FIG. 1;

FIG. 3 is a section taken on the plane passing through the line 3—3 of FIG. 1;

FIG. 4 is a section taken on the plane passing through the line 4—4 of FIG. 1;

FIG. 5 is a section taken on the plane passing through the line 5—5 of FIG. 1;

FIG. 6 is a pictorial view illustrating apparatus for performing the method;

FIG. 7 is a top plan view of a portion of the knitted wire belt;

FIG. 8 is a sectional view showing one of the grinding wheels in operative position;

FIG. 9 is an end elevation of a finished pipe insulation; and

FIG. 10 is a pictorial view of a shoehorn former.

Referring to the drawing there is disclosed, in FIG. 6, a diagrammatic representation of the method of the instant invention. A felt 1 of insulating material, especially of the type of a mineral wool pipe insulation, is fed onto an endless conveyor belt 2 which is mounted on the pulleys 3 and 4 for movement in a direction indicated by the arrows. A mandrel 5 having a separating wall 6 is positioned inside a cylindrical tube 7. The belt 2 is moved through the tube 7 so that the belt and the insulating material are wrapped around the mandrel 5 to form, as illustrated in FIG. 9, a circular pipe insulation 8 having a longitudinal slit 9 for easy installation on a pipe.

In FIG. 1, there is depicted apparatus for forming fully round pipe insulation, especially mineral wool pipe insulation. A continuous felt 10 of insulating material is fed from a platform 11 onto a conveyor belt 12 which is loosely mounted on the pulleys 13 and 14 mounted for rotation about relatively fixed axes 13a and 14a, respectively, with the relaxed return portion being guided over suitably mounted rollers 15. The pulley 14 is rotated by the chain 16 powered by the motor 17 and reduction gearing 18. A pinch roll 19, which is adjustably mounted in any desired manner, holds the felt 12 against the pulley 14 with the desired amount of pressure to apply a predetermined amount of force on the belt 12 sufficient to take up the slack in its upper reach. As illustrated in FIG. 7, the belt 12 is of the knitted wire mesh type to enhance manipulation. The belt 12 is not actually driven by chain 16 but by other means described hereinafter, so that it merely rides over the pulleys 13 and 14 under the tension applicable on it by reason of the drive means 16, 17, 18 and the pinch roll 19.

An endless chain 20 is mounted above the belt 12 so that adjacent portions of the chain 20 and the belt 12 move in the same direction. The chain 20 is connected around a driving sprocket 21 and an adjustable idler 22. The sprocket 21 is driven by a link 23 operated by a power source 23a so as to move the chain 20. Secured to the chain 20, in spaced relation, are a plurality of separating walls 24, corresponding to the walls 6 in FIG. 6. These walls 24 are flat, generally triangular pieces of sheet metal having a U-shaped bight 25 which straddles the chain 20. A plurality of bolts 26 pass through openings in the bight 25 to secure the separating walls 24 to the chain for movement therewith.

On the other end of each of the separating walls 24, there is attached a mandrel 27 which consists of a hollow cylinder 28 having a plurality of perforations 29 and a single longitudinal slit 30. In the preferred form, the perforations 29 are 3/16" holes drilled on 1/4" staggered centers. The separating wall 24 passes through the slit 30 and is spot welded to the inner wall 31 of the cylinder 28 opposite the slit 30. Each mandrel 27 is positioned on the chain 20, by the separating wall 24, to come into contact with the insulating material 10 on the belt 12 so that a predetermined thickness of insulating material exists between the mandrel 27 and the belt 12. Extending from each side of the separating wall 24, there is a guide arm 32 having a roller 33 riding in the track 34, mounted by any suitable means adjacent and parallel to the lower reach of chain 20, to hold the mandrels 27 in the proper position against the felt 10. The track is provided with cut out sections at appropriate places for the entrance and exit of the rollers 33.

The felt 10 and the belt 12 are wrapped around the mandrels 27 by a shoehorn former 40, illustrated in FIG. 10, corresponding to tube 7 in FIG. 6. The shoehorn 40 may be considered as a rectangular piece of sheet metal positioned with its longitudinal axis parallel to the plane of movement of the conveyor belt 12. At one end 41, the shoehorn 40 is formed substantially into a circle that gradually opens to an arcuate lip 42 at the other end. The belt 12 rests against the inner surface 43 of the shoehorn so that it is gradually changed from a flat to a circular form as it follows the contours of the shoehorn 40. To assist in forming the felt into the desired circular shape, the shoehorn 40 is provided with a pair of arcuate guide plates 44. For ease of installation, the shoehorn 40 is made in two sections joined along a longitudinal seam 45.

As the belt 12, the insulation 10 and the mandrel 27 leave the circular end 41 of the shoehorn, they enter a baking tube 51 in the rectangular oven 49 for curing. Hot air is supplied to the oven 49 from a heater 52 through the pipes 53 at a minimum air velocity of 150 f.p.m. and the expended air is returned through the pipes 54. The top wall 55 of the oven 49 has a reinforced slit 56 for guiding the separating walls 24. The baking tube 51, having a plurality of perforations 58, is supported in the oven 49 by braces 59 attached to the sides 60 of the oven and the exterior of the tube 51. Sufficient braces are attached to the tube 51 to prevent spreading. A longitudinally reinforced slit 61 in the tube 51 is in alignment with the slit 56 and cooperates therewith to guide the separating walls 24. The inside diameter of the tube 51 is the sum of the outside diameter of the desired pipe insulation plus twice the belt thickness. The tube 51 receives the belt 12, the insulation 10 and the mandrels 27 and retains them in the desired shape during curing in the oven 49. The various units are suitably supported by a plurality of columns 62, only some of which are shown. Adjacent to the oven 49, there is provided a cooling unit 63 that completes the process for the formation of the pipe insulation.

At the exit end of the cooling unit 63, there is a reverse shoehorn 64 that allows the belt 12 to gradually resume its flat shape. As viewed in FIG. 5, the belt 12 becomes flat while the cured insulation remains around the mandrel 27. As the mandrel 27 begins to move around the sprocket 21, it is gradually pulled up through the slit 9 in the formed insulation 8, as shown in FIG. 1, and the pipe insulation continues in a straight line. The pipe insulation 8, as it leaves the conveyor belt 12, has a lip 65 on either side of the slit 9. A pair of grinding wheels 66 located on the opposite sides of the slit 9 remove these lips and at the same time help to constrain the pipe insulation to move forward in a straight line as the mandrels 27 are pulled through the slit 9.

In operation, the chain 20 and the conveyor belt 12 are actuated so that their adjacent portions move in the same direction. A continuous felt 10 of insulating material is fed onto the conveyor 12 adjacent to the pulley 13. To prevent undesirable creases in the finished pipe insulation, the conveyor belt 12 is of wire mesh knitted in a continuous tubular form and then rolled flat. As the chain 20 moves around the idler 22, the mandrels 27 attached thereto come into contact with the felt 10 so as to form a desired thickness of insulating material between the belt 12 and the mandrels 27. The belt 12, felt 10 of insulating material and mandrel 27 then move through the shoehorn former 40 which gradually wraps the belt 12 and the felt 10 of insulating material around the mandrels 27 until the belt and the felt abut the separating walls 24.

The actual movement of the belt, the felt and the mandrels is motivated by the mandrel conveyor chain 20. The mandrels 27 engage the felt 10 on the belt 12 with sufficient pressure so that the felt 10 locks the mandrels 27 to the belt 12. Thus, the mandrels 27 pull the felt 10 and the belt 12 through the shoehorn 40 and the baking tube 51. The drive pulley 14 cooperates with the pinch roll 19 to apply only sufficient force to the conveyor belt 12 to take up the slack in it ahead of the mandrels. For small diameter insulations it is sometimes necessary to increase the pressure of the roll 19 so that more force is placed on the conveyor belt 12 to supplement the main drive means and to prevent slippage between the belt 12, the felt 10 and the mandrels 27. During passage of the composite through the shoehorn and the oven, the belt 10, the felt 12 and the mandrel 27 move at the same speed. The pulley 14 rotates at a slightly higher speed than the movement of the belt 12 by the mandrels 27 so that the proper force is applied on the belt ahead of the mandrels at the pinch roll 19.

The composite passes from the shoehorn 40 through the circular section 50 to the baking tube 51 in the oven 49 for curing and then to the unit 63 for cooling. The circular end 41 of the shoehorn 40 is of smaller diameter than the baking tube 51 so that there will be no tendency for the composite to catch when passing from the shoehorn to the tube. As the finished pipe insulation leaves the cooling unit 63, it passes through a reverse shoehorn 64 that allows the belt 12 to gradually resume its flat shape. The mandrels 27 are then pulled up through the slit 9 in the pipe insulation 8 by the action of the sprocket 21.

Having thus described the invention in rather full detail, it will be understand that these details need not be strictly adhered to and that various changes and modifications may suggest themselves to one skilled in the art, all falling within the scope of the invention as defined by the subjoined claims.

What we claim is:

1. Apparatus for forming pipe insulation which comprises an endless belt, means for feeding a continuous felt of insulation containing an uncured binder onto said belt, a plurality of mandrels positioned to come successively into contact with said felt of insulation, an endless chain positioned above said belt, a separating wall mounting said mandrels, on said chain, each of said separating walls having a length adjacent the associated mandrel substantially coextensive with the longitudinal length of said associated mandrel, means for moving said chain to move said felt of insulation, said belt and said mandrels in the same direction, means for wrapping said belt and said felt of insulation around said mandrels, and means for curing said binder in said felt of insulation in the circular form.

2. Apparatus as in claim 1 wherein said mandrels engage said felt with sufficient pressure so that said felt of insulation, said belt and said mandrels are locked together.

3. Apparatus as in claim 1 wherein each of said mandrels comprises a foraminous cylinder having a longitudinal slit, and said separating wall passes through said slit and is secured to the inner wall of said mandrel.

4. Apparatus for forming pipe insulation which comprises an endless knitted wire mesh belt, means for feeding a continuous felt of insulating material containing an uncured binder onto said belt, a plurality of mandrels carried by an endless chain and positioned so as to come successively into contact with portions of said felt of insulating material to lock together said mandrels, said felt of insulating material and said belt, a separating wall mounting each of said mandrels on said chain, means for moving said chain each of said separating walls having a length adjacent the associated mandrel substantially coextensive with the longitudinal length of said associated mandrel, to move said felt of insulating material, said belt and said associated mandrels in the same direction, a shoehorn for wrapping said belt and said felt of insulating material around said mandrels with the longitudinally extending side walls of said felt of insulating material in abutting relationship with said separating wall, and means for curing said binder in said felt of insulating material while in the composite form.

5. Apparatus as in claim 4 wherein said shoehorn comprises a rectangular piece of sheet metal having a substantially circular end which gradually opens to form an arcuate lip and positioned so that the belt during passage through said shoehorn changes from a flat to a circular shape.

6. Apparatus as in claim 5 wherein each of said mandrels substantially comprises a hollow foraminous cylinder.

7. Apparatus as in claim 4 wherein said curing means comprises an oven and a foraminous retaining tube mounted in said oven for receiving said felt of mesh belt, said insulating material and said mandrels.

8. Apparatus as in claim 7 wherein said oven and said tube each have a longitudinal slit for receiving said separating wall.

9. Apparatus as in claim 8 wherein the diameter of said retaining tube is slightly larger than the diameter of said circular end of said shoehorn.

10. Apparatus for forming pipe insulation which comprises an endless knitted wire mesh belt, means for feeding a continuous felt of insulating material containing an uncured binder onto said belt, a plurality of mandrels carried by an endless chain and positioned so as to come successively into contact with portions of said felt of insulating material to lock together said mandrels, said felt of insulating material and said belt, a separating wall mounting each of said mandrels on said chain, each of said separating walls having a length adjacent the associated mandrel substantially coextensive with the longitudinal length of said associated mandrel, means for moving said chain to move said felt of insulating material, said belt and said associated mandrels in the same direction, a shoehorn for wrapping said belt and said felt of insulating material around said mandrels with the longitudinally extending side walls of said felt of insulating material in abutting relationship with said separating wall, an oven for receiving and curing said binder in said felt of insulating material while in the composite form, a cooling unit adjacent to said oven, a reverse shoehorn adjacent to said cooling unit for allowing said belt to return gradually to its original shape and means to take the slack out of said belt during the operation of the apparatus.

11. Apparatus for forming pipe insulation comprising a belt, means for feeding a felt of insulation containing an uncured binder onto said belt, a plurality of mandrels positioned to come successively into contact with said felt of insulation on said belt, means associated with each of said mandrels for applying sufficient pressure on said felt of insulation and said belt to lock said mandrel, said felt of insulation and said belt together for substantially simultaneous movement, means for applying a force to said mandrels to move said mandrels, said felt of insulation and said belt while locked together in the same direction, means for wrapping said felt of insulation and said belt around said mandrels, and means for curing said binder in said felt of insulation.

12. Apparatus as defined in claim 11 wherein said means for wrapping said felt of insulation and said belt around said mandrels comprises a rectangular piece of sheet metal formed with a substantially cylindrical end portion which gradually opens to an arcuate lip entrance portion, and said means being positioned so that said belt and said felt of insulation when passing through said means from said arcuate lip entrance portion to said cylindrical end portion changes from a flat to a substantially cylindrical form.

13. Apparatus as described in claim 12 wherein said belt comprises a knitted wire mesh belt.

References Cited in the file of this patent

UNITED STATES PATENTS

| | | |
|---|---|---|
| 644,025 | White | Feb. 20, 1900 |
| 775,542 | McConnell | Nov. 22, 1904 |
| 1,810,585 | Young | June 16, 1931 |
| 2,135,880 | Waldman et al. | Nov. 8, 1938 |
| 2,778,759 | Stephens et al. | Jan. 22, 1957 |

UNITED STATES PATENT OFFICE
CERTIFICATE OF CORRECTION

Patent No. 3,050,106                                          August 21, 1962

Walter G. Pusch et al.

It is hereby certified that error appears in the above numbered patent requiring correction and that the said Letters Patent should read as corrected below.

In the drawings, Sheets 1 and 2, and in the heading to the printed specification, lines 2 and 3, title of invention, for "METHOD AND APPARATUS FOR FORMING PIPE INSULATION", each occurrence, read -- APPARATUS FOR FORMING PIPE INSULATION --; column 4, lines 51 to 55, beginning with "mounting each of" strike out all to and including "insulating material, said", in line 55, and insert instead -- mounting each of said mandrels on said chain, each of said separating walls having a length adjacent the associated mandrel substantially coextensive with the longitudinal length of said associated mandrel, means for moving said chain to move said felt of insulating material, said --.

Signed and sealed this 19th day of March 1963.

(SEAL)
Attest:

ESTON G. JOHNSON
Attesting Officer

DAVID L. LADD
Commissioner of Patent